United States Patent
Riedl (10) Patent No.: US 9,067,390 B2
(45) Date of Patent: Jun. 30, 2015

(54) DATA CARRIER CARD HAVING A SECURITY THREAD

(75) Inventor: Josef Riedl, Attenkirchen (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/233,472

(22) PCT Filed: Jun. 4, 2012

(86) PCT No.: PCT/EP2012/002362
§ 371 (c)(1),
(2), (4) Date: Jan. 17, 2014

(87) PCT Pub. No.: WO2013/013736
PCT Pub. Date: Jan. 31, 2013

(65) Prior Publication Data
US 2014/0138444 A1 May 22, 2014

(30) Foreign Application Priority Data
Jul. 26, 2011 (DE) .................. 10 2011 108 527

(51) Int. Cl.
*G06K 19/02* (2006.01)
*B32B 27/30* (2006.01)
*B29C 47/06* (2006.01)
*B29C 47/00* (2006.01)
*B32B 27/36* (2006.01)
*B32B 27/40* (2006.01)
*B42D 25/00* (2014.01)
*B32B 27/08* (2006.01)
*B32B 3/18* (2006.01)
*B29L 17/00* (2006.01)
*B29C 47/56* (2006.01)
*B29C 47/92* (2006.01)
*B42D 25/355* (2014.01)

(52) U.S. Cl.
CPC ............. *B32B 27/302* (2013.01); *B29C 47/062* (2013.01); *B32B 27/08* (2013.01); *B32B 3/18* (2013.01); *B42D 2033/18* (2013.01); *B29L 2017/006* (2013.01); *B29C 47/0019* (2013.01); *B29C 47/56* (2013.01); *B29C 47/0069* (2013.01); *B29C 47/92* (2013.01); *B29C 2947/92704* (2013.01); *B29C 47/0021* (2013.01); *B32B 27/304* (2013.01); *B32B 27/36* (2013.01); *B32B 27/365* (2013.01); *B32B 27/40* (2013.01); *B32B 2425/00* (2013.01); *B42D 25/355* (2014.10); *B42D 25/00* (2014.10)

(58) Field of Classification Search
CPC .......... G06K 19/077; G06K 19/07372; G06K 19/07749; G06K 19/06; G06K 19/02; G06K 19/00; G06K 5/00
USPC .......................... 235/488, 487, 380, 492, 451
See application file for complete search history.

(56) References Cited

U.S. PATENT DOCUMENTS

2001/0005551 A1* 6/2001 Siero ............................. 428/343
2004/0239097 A1* 12/2004 Boehm et al. .................. 283/57
(Continued)

FOREIGN PATENT DOCUMENTS

| DE | 102004013201 A1 | 10/2005 |
|---|---|---|
| FR | 2935635 A1 | 3/2010 |
| WO | 2009153056 A2 | 12/2009 |
| WO | 2011072818 A1 | 6/2011 |

OTHER PUBLICATIONS

International Search Report for corresponding International PCT Application No. PCT/EP2012/002362, mailed Aug. 31, 2012.

*Primary Examiner* — Edwyn Labaze
(74) *Attorney, Agent, or Firm* — Workman Nydegger (57) ABSTRACT

A data carrier card, in particular a chip and/or magnetic strip card, has a card body comprising one or more films and a security thread integrated in the card body. The security thread, or at least a substrate of the security thread, is coextruded in the form of a thread strip in one of the films.

20 Claims, 3 Drawing Sheets

(56) References Cited

U.S. PATENT DOCUMENTS

| | | |
|---|---|---|
| 2008/0272513 A1 | 11/2008 | Stenzel |
| 2009/0218401 A1* | 9/2009 | Moran et al. .................. 235/439 |
| 2010/0001506 A1* | 1/2010 | Rosset ............................ 283/72 |
| 2010/0276919 A1 | 11/2010 | Dietemann |
| 2011/0000967 A1* | 1/2011 | Labrec et al. ................. 235/488 |
| 2011/0114731 A1 | 5/2011 | Riedl |
| 2011/0174884 A1* | 7/2011 | Endres et al. ................. 235/488 |
| 2012/0251753 A1 | 10/2012 | Riedl |
| 2013/0062416 A1* | 3/2013 | Snelling et al. ............... 235/491 |
| 2013/0127087 A1 | 5/2013 | Stenzel |

* cited by examiner

DATA CARRIER CARD HAVING A SECURITY THREAD

CROSS-REFERENCE TO RELATED PATENTS APPLICATIONS

This is the U.S. national stage claimant the benefit of International Application No. PCT/EP2012/002362, filed on Jun. 04, 2012.

BACKGROUND

The present invention relates to a data carrier card comprising a card body and a security thread integrated in the card body, as well as to a method for manufacturing such a data carrier card.

SUMMARY

Data carrier cards, in particular chip or magnetic strip cards, are mostly manufactured from one plastic foil or from several mutually laminated plastic foils, which form the card body of the data carrier card. Their card bodies mostly comprise a card core which contains data memory and/or data processing means, such as microchips or magnetic strips. Protective or cover foils, which are laminated to front and back side of the card core, can be transmissive, that is to say, translucent or transparent, or opaque, depending on the requirements. The card core itself likewise consists of one or several plastic foils which are mutually laminated. In the case of several plastic foils the card body and also the card core of the data carrier card form respectively one laminated foil composite. Where applicable, one can dispense with the provision of protective or cover foils.

It is furthermore known to provide in or on the card core of such a data carrier card a security thread as a security element, as it is known in particular from bank notes.

Such a typical security thread comprises a carrier foil, for example made of PET, having a print, having a coating, having special pigments embedded in the carrier foil, and/or having other security elements which prevent an imitation. Moreover, typical bank-note-like security threads regularly have a very small width, in comparison to the bank note, and are recognized as authenticity and/or authenticating feature by a viewer.

Incorporating a typical bank-note-like security thread into a data carrier card causes technical difficulties, however. For example, a problem here is to apply such a security thread to a plastic foil of the card body and to simultaneously realize a mechanically stable composite. For achieving a sufficient strength of the composite made of security thread and plastic foil, normally it is necessary to laminate the two elements with the aid of special adhesives, which might limit the choice of the material for security thread and plastic foil. In any case, this employment of special adhesives leads to additional production steps, which increases effort and costs.

Furthermore, the further processing of a foil having an applied security thread is made more difficult by the latter, by a printing directly on security thread and surrounding plastic foil not being readily possible.

The incorporation of a security thread may further lead to a local thickening of a data carrier card, which undesirably impairs the appearance thereof. In this connection, there is basically the possibility to employ a security thread without carrier foil, for example in the form of a transfer element. The durability of such security threads without carrier foil is very poor, however. They have an elevated susceptibility to external pressure, extreme temperatures and chemical influences.

From US 2010/0276919 A1 there is known a security foil suitable for bank notes, which consists of a coextruded base body and a transparent portion connected thereto. The coextruded base body comprises a core layer arranged in sandwich-like fashion between two cover layers. Security elements can be incorporated in each of the layers as well as in the transparent portion. A security thread is one of several possible security elements. For the manufacturing there has been basically proposed the possibility to incorporate the security elements of the coextruded base body already before the coextrusion. But when the base body is manufactured by coextrusion and when in doing so a security thread is to be incorporated into the starting material before the coextrusion, the security thread must withstand the coextrusion process and be executed in accordingly stable fashion. A controlled placement in the coextruded body is then, moreover, no longer readily possible. Because of the effort resulting therefrom, the incorporation of a typical security thread before the coextrusion is unsuitable for mass applications.

Altogether, the incorporation of a security thread into the card body of a data carrier card leads to an elaborate and cost-intensive manufacturing, to restricted variation and modification possibilities in the further processing of the plastic foil having security thread and it might lead to an impaired appearance of the data carrier card.

Against this background, it is the object of the present invention to state a data carrier card having a security thread, which can be manufactured cost-efficiently and offers a plurality of degrees of freedom in the further processing. It is further the object of the present invention to state a suitable manufacturing method for such a data carrier card.

The object is achieved by a data carrier card and a manufacturing method according to the independent claims. Developments of the invention are stated in the dependent claims.

The data carrier card of the invention comprises a card body which has one or several plastic foils as well as a security thread integrated in the card body. The security thread here is coextruded with the one foil or with at least one of the several foils of the card body.

The invention is based on the finding that a security thread can be integrated into one of the plastic foils of the card body of the data carrier card already during the foil manufacturing, by it being coextruded in the form of a thread strip lying in the area dimension of a foil and thus forming a component of this foil. This achieves a simple and cost-efficient manufacturing method. Manufacturing steps hitherto required for the separate incorporation of the security thread into the card body of the data carrier card are omitted. Accordingly, no special adhesives for manufacturing the composite of plastic foil and security thread must be employed, which also eliminates restrictions in the choice of the material which might result therefrom. The plastic foil coextruded with the security thread can be a cover layer or a layer of the card core of the card body. Here, the data carrier card arises from the card body for example by printing.

Since the security thread is integrated, according to the invention, into one of the plastic foils of the card body by coextrusion, the further processing of the foil coextruded with the security thread does not differ from the further processing of other plastic foils without security thread, for example plastic foils designed homogeneously over the full area. Printing can be effected onto the foil, which was coextruded together with the security thread, in all the surface regions, that is to say, above as well as beside the security thread with all the common printing methods without restrictions.

The data carrier card of the invention also solves the problem that security threads represent a foreign body in the laminated foil composite in conventional data carrier cards, which decreases the strength and the mechanical stability of the data carrier card equipped therewith at the position of the security thread; in known data carrier cards this foreign-body behavior furthermore produces an undesired predetermined breaking point at the point of the security thread, which may be a weak point as to attacks by forgers to disassemble a data carrier card in its components. This is primarily the case when a security thread having a PET carrier foil is employed. By the integration of the security thread per coextrusion according to the invention, however, no predetermined breaking point arises at the point of the security thread, because the foil composite of the card body is equally sturdy and strong at the point of the coextruded security thread as in the remaining areal regions lying beside the security thread.

The security thread is based in a per se known manner on a narrow thread strip, which for example has a width between 0.5 mm and 10 mm, preferably less than 8 mm, particularly preferably between 2 and 5 mm. With data carrier cards in the ID 1 format (edge lengths 85.60 mm×53.98 mm) there thus arises a narrow to very narrow security thread. Alternatively, the width of the security thread can also be chosen in dependence on the card dimensions. The width of the security thread then has for example a width of between 1 and 20% of the width of the strip foil, preferably less than 15%, preferably between 5% and 10%. If the remaining areal regions are likewise of strip-shaped configuration, the security thread preferably has the smallest width of the various strip-shaped regions of the at least one foil of the card body. Here, the security thread usually has a constant width.

The security thread here is flat and configured to be uniform and thus homogeneous in the area dimension as well as usually also in the direction of the thickness. By coextrusion there can be advantageously produced already the finished security thread by the plastic melt forming the security thread being admixed with suitable additives, as they will be explained hereinafter. In a likewise advantageous alternative, by the coextrusion there is produced a security-thread substrate which may contain particular suitable additives and which creates a finished, bank-note-like security thread by a simple further measurement, for instance by printing.

Preferably, exactly one security thread is provided in the data carrier card. Accordingly, exactly one thread strip configured as security thread is provided in the at least one coextruded foil of the card body. Such a single thread strip clearly stands out preferably visually from the surrounding regions and is easily recognized as a security thread by a viewer due to its design, for example due to its width, due to the pigments and substances used in substrate and/or printing, due to incident/transmitted light effects and/or due to authenticity and/or authenticating features. Accordingly, it is advantageous when the remaining areal regions of the at least one foil are also configured in strip-shaped fashion and form further strips which are not recognized as security threads and not configured as security threads. Expediently, the remaining regions or strips do not have particularly suitable additives, which the thread strip has, but they have other additives than contain the security thread or the thread strip carrying it. The remaining regions, moreover, preferably possess a larger width than the security threads, do not convey any incident or transmitted light effects and/or do not show any authenticity and/or authenticating features.

In a preferred realization of the data carrier card the at least one foil coextruded with the security thread is configured as a strip foil having parallel strips of constant width, in which the security thread forms a narrow thread strip. In the case of two strips, these are the security thread as well as a neighboring, directly bordering strip of the foil which extends over the remaining area of the strip foil. Accordingly, the security thread is arranged at an edge of the card body. The security thread and the neighboring strip of the strip foil differ in their respective condition. For example, the two strips are based on different plastic materials. They can also be based on the same plastic material, however, and merely differ in their admixed additives. Preferably, the security thread is visually distinguishable from the neighboring strip. Preferably, the strip foil comprises three strips, however, namely the narrow security thread or the underlying thread strip, as well as to the right and left thereof two wide strips which extend over the rest of the area of the strip foil. That is to say, further strips border on both sides of the security thread. These have preferably an identical condition.

The at least two strips of the strip foil are usually configured continuously, that is to say, they extend over the entire length of the card body of the data carrier card. The integration of strip foils into plastic cards is basically known from WO 2009/153056.

Preferably, all the strips of the strip foil have the same layer thickness. Thus, the integration of the security thread into the card core does not cause any undesired elevation in the area dimension, that is to say, no undesired thickness variation in the data carrier card. Alternatively, however, the security thread may also have in targeted fashion a smaller or larger layer thickness than the surrounding or the remaining strips.

In a preferred realization of the data carrier card, the card body, particularly preferably a card core of the card body, has a plurality of, that is to say, two, three or more than three strip foils arranged one over the other and respectively coextruded, in which respectively one narrow thread strip forms a security-thread substrate. Here, the various coextruded strip foils having integrated security-thread substrates preferably are so mutually laminated or coextruded that their respective security-thread substrates are arranged congruently one over the other. Preferably, the security-thread substrates of the various strip foils have an identical width. This achieves additional degrees of freedom in the realization of the security thread resulting from the different security-thread substrates.

The security thread can be configured to be transmissive, whereby transmissive is understood to mean both completely light-transmissive, that is to say transparent, and partly light-transmissive, i.e. translucent. These specifications are valid for the visible spectral region. The security thread can also be configured to be opaque, however, that is to say, light-non-transmissive for a viewer. Furthermore, the security thread can be configured to be colored, for instance white, or colorless. A white security-thread substrate is well suited for further printing. The region or regions surrounding the security thread of the at least one plastic foil, in the case of a strip foil the neighboring strips, differ from the security thread preferably visually. For example, the security thread can be transmissive, while the surrounding region or regions are opaque. Alternatively, the security thread and the surrounding regions are configured in different-colored fashion, which can be achieved by suitable, embedded color pigments or dyes.

In a preferred realization, the security thread comprises pigments and/or other kinds of additives, which can represent a security or authenticity feature and/or are optically active, that is to say, achieve a particular, visually perceptible effect for a viewer, in particular an optically variable effect. These are for example color-shift pigments which produce a color-shift effect. These are based for example on one or several interference layers and are known under the name Colorcrypt, Colorstream, Iriodin or OVI pigments. Such color-shift pigments can also be based on liquid crystals, however, in particular on cholesteric liquid crystals, which are known under the name STEP pigments. Alternatively or additionally, the security thread can also contain silver-colored, gold-colored and/or lustrous pigments or substances, which reproduce the appearance of a per se known security thread well. Here, in particular silvery lustrous pigments imitate the metallization layer which often is to be found in conventional security threads. The security thread can also contain, however, fluorescent or thermochromic pigments or substances, as well as laser-sensitive or laser-changeable pigments or substances which allow a processing of the security-thread substrate per laser radiation, for example for the purpose of personalization. Furthermore, in particular IR-absorbing pigments, such as carbon black are possible. The security thread can also contain, however, other kinds of elements which can represent a security feature or are optically active, such as Charms, taggants or mottling fibers. Here, the security thread contains preferably a combination of several of the mentioned pigments and/or substances.

These pigments and/or substances can be arranged in the security-thread substrate. Alternatively or additionally, to the security-thread substrate there can be applied on a front and/or back side, that is to say, as an overprint and/or an underprint, a printed layer of a printing ink which contains the mentioned pigments and/or substances. The printed layer can be arranged here in congruent fashion to the security thread or the security-thread substrate or also extend to further, for example neighboring regions of the foil coextruded with the security thread or the security-thread substrate. The printed layer can also be configured over the full area. Alternatively or additionally, there can also be provided a metallization layer above the security thread or security-thread substrate, as it is known from conventional security threads.

If no printed layer is provided, the security thread is usually formed by the security-thread substrate with pigments or substances contained therein which can form security features and/or are optically active. If, however, a printed layer is provided, the security thread is usually formed by the combination of security-thread substrate and printed layer. In such a printed layer there can be provided gaps, which convey information to a viewer. Preferably, the security thread makes available to a viewer mutually different items of incident light and transmitted light information.

The printed layer arranged above the security thread is applied preferably by screen printing or offset printing method. By offset printing method in particular guilloche, micro, iridescent or fluorescent prints can be realized. The screen printing method is advantageous for applying the printing inks having the above-mentioned pigments and/or substances which can represent security features or are optically active. With the aid of the screen printing method also a mirror or rainbow print can be realized. For this purpose, in the first case preferably a so-called mirror ink is printed, which contains for example lustrous, metallically lustrous or silvery lustrous pigments.

The different, above-mentioned pigments and substances as well as the different printed layers and printing methods can be combined with each other in any desired fashion. The present invention thus creates many degrees of freedom in the realization of the security thread coextruded together with a plastic foil of the card body of the data carrier card.

In a further preferred realization of the data carrier of the invention, the card body comprises, in addition to the foil coextruded together with the security thread, at least one further foil, with the foils being mutually laminated or coextruded and the further foil preferably being configured over the full area. This further foil serves, for example, for the mechanical stabilization of the coextruded foil having the security thread or the security-thread substrate and/or as a protective layer. Such a further foil can be both arranged on the front side and on the back side of the foil coextruded together with the security thread. The further foil can be a cover layer of the data carrier card, so that the coextruded foil forms an inner foil of the data carrier card and thus a card core layer. Alternatively, the further foil can be a card core foil, while the coextruded foil likewise can be a card core foil or also a cover layer. The foil coextruded together with the security thread and the one or several further foils lie directly one above the other, that is to say, they directly border on each other—apart from a printing or coating, where applicable. The further foil on front and/or back side of the coextruded foil is preferably transparent or translucent. It can be employed for incorporating additional pigments or features and for example contain laser-sensitive or laser-changeable pigments for a laser inscription.

In a particularly preferred realization, the security thread comprises fluorescent pigments. On the front and back side thereof there is arranged respectively over the full area a layer or foil which absorbs the excitation light of the fluorescent pigments. In the simplest case, the further foils arranged on front and back side are UV-absorbing, but transparent or translucent to visible light. There thus results a security thread which fluoresces upon UV excitation only at the faces on which the security thread is not covered by a UV-absorbing layer, and thus makes visible the UV excitation light only there.

Preferably, above the security thread and/or at a margin or an edge of the card body there are arranged lenses or microlenses, preferably cylindrical lenses. In the latter case, one also speaks of so-called bled-off lenses. Such lenses allow an improved observation of the security thread or of the margin region of the card body. This is advantageous for example when microwriting, for instance in the security thread, or a so-called MLI (multiple laser image), a CLI (changeable laser image) or a DLI (dynamic laser image) are employed. Here it is advantageous to provide transparent intermediate layers as spacer layers, thereby making possible larger lens radii which facilitates the manufacturing of the lenses.

In addition to the security thread created per coextrusion according to the invention, there can additionally be provided a conventional security thread in the data carrier card.

In addition to the above-described data carrier card, the invention further relates to a method for manufacturing such a data carrier card having a card body comprising one or several plastic foils and at least one security thread. Here, the security thread is coextruded with at least one of the foils. The coextrusion is effected preferably with a multi-nozzle extruder preferably at a temperature of 230° C. and above, in particular at 250° C. Further plastic foils can be laminated subsequently or coextruded simultaneously. The manufacturing method can comprise further steps, for example punching the card core from the coextruded foil, incorporating a chip or a magnetic strip and/or personalizing the data carrier card by laser inscription.

BRIEF DESCRIPTION OF THE DRAWINGS

Further embodiments and advantages of the invention will be explained hereinafter by way of example with reference to the accompanying Figures. The embodiments represent preferred embodiments to which the invention shall be in no way restricted. The shown Figures are schematic representations which do not reflect the real proportions but rather serve to improve the clearness of the different embodiments.
There are shown.

DETAILED DESCRIPTION OF VARIOUS EMBODIMENTS

Figure 1:
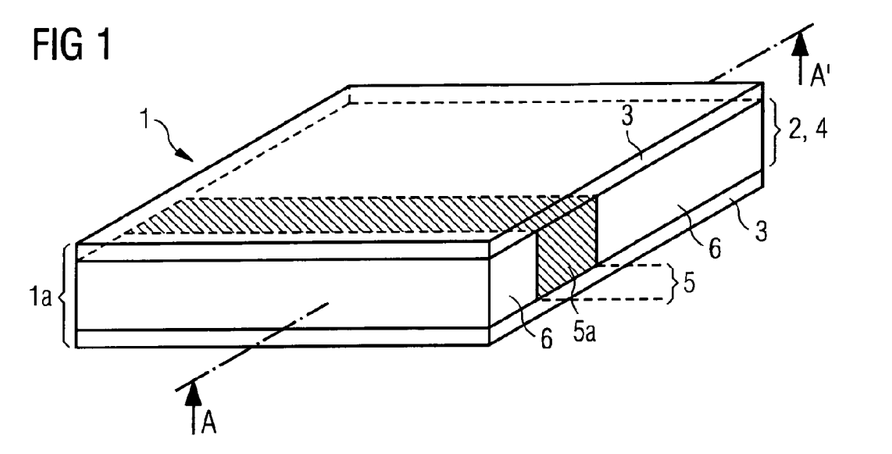
FIG. 1 a perspective view of a first embodiment of the invention.
Figure 2:
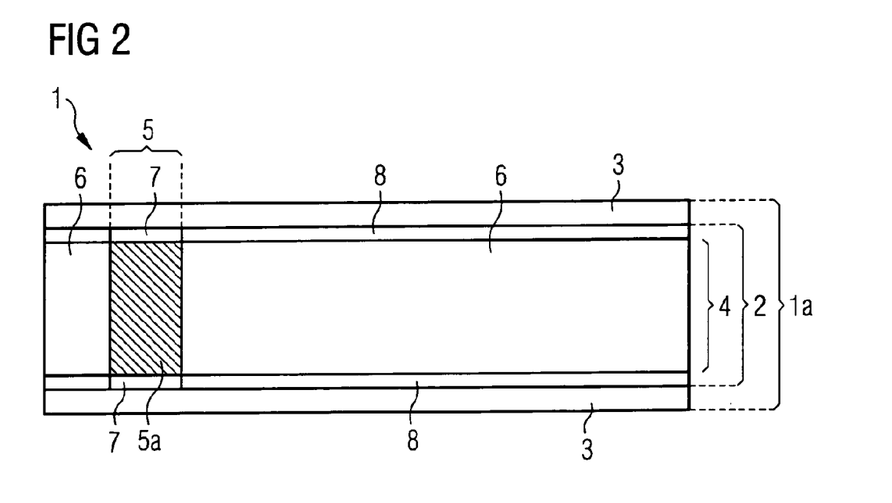
FIG. 2 a cross section through the first embodiment.

In FIG. 1 there is perspectively represented a first embodiment of a data carrier card 1. The data carrier card 1 comprises a card body 1a having a card core 2 with transparent cover layers 3 being arranged on the front and back side thereof; the card core 2 consists of at least one foil 4. Card core 2 and cover layers 3 together form the card body 1a. On the card core 2 there can be configured printed layers 7, 8, as indicated in FIG. 2. The card core 2 has a typical thickness of between 80 and 840 µm, so that the entire data carrier card 1 possesses a sufficient stability. The data carrier card 1 has an integrated security thread 5.

In the shown embodiment, the card core 2 comprises exactly one foil 4, which has been manufactured by coextrusion and is configured as a strip foil. The coextruded foil 4, hereinafter referred to as strip foil, has parallel strips 5a, 6, lying side by side in the area dimension of the foil, with different conditions. The strip foil 4 comprises here at least one narrow, in comparison to the width of the foil, strip 5a whose condition differs in at least one property from the condition of the neighboring strip 6; in view of its small width the strip 5a is hereinafter referred to as thread strip.

The thread strip 5a carries at least one security feature, which is tamper-resistant and prevents an imitation of the thread strip 5a or of a data carrier card 1 equipped therewith; in a variant the thread strip 5a unfolds, as will be described hereinafter, an interaction with at least one other layer of the data carrier card 1, e.g. with a printed layer, and produces a tamper-resistant security feature by this interaction. In the first case, the thread strip 5a directly imitates a security thread in the style of a bank note, in the second case the thread strip 5a acts as a security-thread substrate, which together with another layer of the data carrier card 1 reproduces a bank-note-like security thread. In both cases, the finished data carrier card 1 thus possesses an integrated security thread in the style of a bank note, which is either directly formed by the thread strip 5a or which arises by the cooperation of the thread strip 5a with another layer of the card body 1a.

The two strips 6 bordering on the thread strip 5a expediently possess respectively a constant width and are of an identical condition—which differs at least in one property from the condition of the thread strip 5a.

Typically, the strips 6 bordering on the thread strip 5a of the coextruded strip foil 4 are designed such that the thread strip 5a clearly differs from the neighboring strips 6 visually. For example, the strips 6 are opaque, non-lustrous and possess a pronounced inherent color, while the thread strip 5a shows a transparent or at least transmissive base material and shows a luster effect.

The cover layers 3 are plastic foils, which are laminated in the usual way to the card core 2. Optionally, the cover layers 3 can also be omitted. The card core 2 alone then forms the card body 1a of the data carrier card 1.

Although in FIG. 1 there is shown only one strip foil, a card body 1a or a card core 2 of a card body 1a, of course, can also be constructed from two, three or more than three coextruded strip foils 4 arranged one over the other, which each have a thread strip 5a. The strip foils 4 are then so arranged that the respective thread strips 5a lie one over the other; each thread strip 5a then forms a part of the security thread 5.

FIG. 2 shows a cross section through the data carrier card 1 of FIG. 1 along the line A-A; in FIG. 2 there are additionally represented printed layers 7, 8 arranged directly on the strip foil 4. The card core 2 is here formed by the strip foil 4 and the printed layers 7, 8. In the embodiment, the printed layers 7, 8 are configured respectively on the two sides of the strip foil 4; they are preferably coordinated to the design of the strips 5a, 6, as it is indicated in FIG. 2. The printed layers 7 lie congruently above the thread strip 5a, here. The thread strip 5a consists of a transmissive material. The printed layers 7 consist e.g. of a mirror ink and are expediently applied by a screen printing method. The application is effected such that the resulting printed layers 7 are mirroring and, depending on the layer thickness of the printed layer 7, opaque or transmissive. It is possible to configure a printed layer 7 only on one side of the strip foil 4.

The printed layers 8 likewise applied to both sides cover the remaining part of the strip foil 4 which is not covered by the printed layers 7. Preferably, they have the same thickness as the printed layers 7. The printed layers 8 are basically optional; like the printed layers 7 a printed layer 8 can also be provided only on one side of the strip foil 4.

In the embodiment shown in FIG. 2, the thread strip 5a serves as the security-thread substrate, which together with the printed layers 7 attached congruently thereover forms a bank-note-like security thread 5.

The cooperation of the transmissive security-thread substrate 5a with the printed layers 7 executed in mirror ink, normally leads already directly to metallic, lustrous effects, which imitate effects as they are known from conventional security threads. With the aid of printed layers 7 of mirror ink arranged on front and/or back side there can be produced for instance interference effects. Suitable inks for this are e.g. so-called "rainbow-silver-inks", as they are available from Proell KG, 91781 Weissenburg, Germany. In some cases a bank-note-like security thread is directly imitated so well that further measurements for improving this intended effect are omitted.

In one realization that supplies an enhanced imitation of a security thread, suitable pigments or additives are provided in the thread strip 5a and/or in the printed layers 7, which act as security or authenticity feature. The additives or pigments can e.g. be optically active and achieve a particular, visually perceptible effect for a viewer, for instance an optically variable effect. Such additives are for example color-shift pigments which produce a color-shift effect, such as Colorcrypt, Colorstream, Iriodin, OVI or STEP pigments; other additives are for instance silver-colored, gold-colored and/or lustrous pigments or substances which have a glancing angle and thus reproduce the appearance of a per se known security thread, which is the case in particular with silvery lustrous pigments. In other embodiments also fluorescent or thermochromic pigments or substances can be provided, and likewise laser-sensitive or laser-changeable pigments or substances which permit a subsequent processing of the security-thread substrate 5a per laser radiation; for the latter in particular IR-absorbing pigments such as carbon black come into consideration.

The thread strip 5a and/or the printed layer 7 may further contain also other suitable elements, such as Charms, taggants or mottling fibers.

Likewise, the thread strip 5a and/or the printed layer 7 can contain a combination of several of the mentioned pigments and/or substances. These substances and pigments, first of all laser-sensitive or laser-changeable pigments or substances can be provided also in the cover layers 3.

The printed layer 7 can further have—not represented—gaps, for instance in the form of a negative writing, which serve for example as information for a viewer or for creating incident light/transmitted light effects.

In a particularly simple variant of the first embodiment, the printed layers 7 are omitted and merely in the thread strip 5a pigments or substances are provided, for example silvery lustrous pigments which form security features and/or are optically active. In this variant the thread strip 5a with the pigments or substances contained therein directly forms a security thread. In this way, in some cases, already a sufficiently good imitation of a conventional, bank-note-like security thread can be achieved.

As a base material for the different foils of the data carrier card 1, in particular for the thread strip 5a and the strips 6 of the coextruded strip foil 4 technical polymers such as polycarbonate (PC), polybutylene terephthalate (PET), polyethylene terephthalate glycol (PETG), thermoplastic elastomers (TPE), thermoplastic elastomers based on urethane (TPU), thermoplastic elastomers based on copolyesters (TPC), polyolefins, polyamide (PA), polyvinyl chloride (PVC) and acrylonitrile-butadiene-styrene copolymer (ABS) or mixtures thereof come into consideration.

Figure 3:
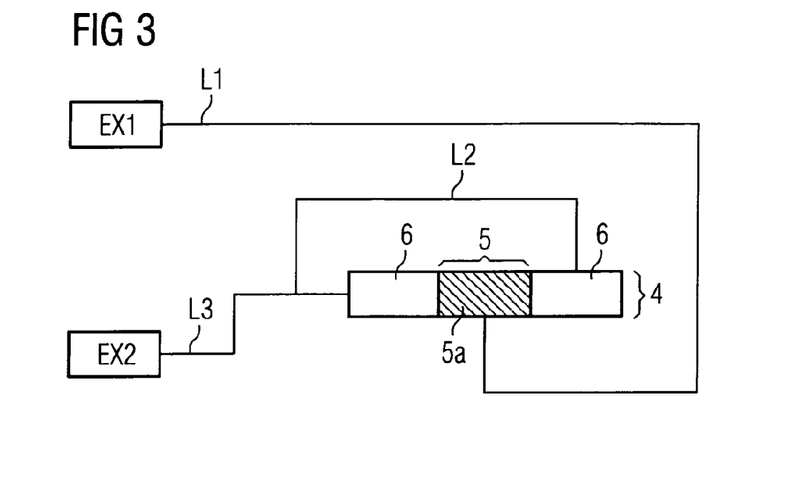
FIG. 3 a scheme of a coextrusion arrangement.

In FIG. 3 there is schematically represented a coextrusion arrangement for forming a coextruded strip foil 4 in the form of a strip foil. In a first extruder EX1 there is produced a molten stream for forming a thread strip 5a, as indicated by a schematic line L1. Further, in the extruder EX2 there is produced a second molten stream for forming the two strips 6 of the strip foil 4, which is indicated by the schematically represented lines L2 and L3. Such coextrusion arrangements and methods are commonly known, so that a detailed description of such methods and the multi-nozzle extruders or parallel multi-nozzle extrusion apparatuses, which are for example employed, is omitted herein. In this connection, reference is made to the print DE 10 2004 013 201 A1, and the apparatuses, methods, and method steps for the coextrusion mentioned therein are incorporated into the disclosure of the present print. By the represented coextrusion there arises a coextruded strip foil 4 in the form of a strip foil having respectively homogeneously configured strips 6 and a homogeneously configured security-thread substrate 5a. It is advantageous here when the coextrusion takes place at melt temperatures of 230° C. and above, for example at 250° C., because a homogeneous, coextruded strip foil 4 without mechanical weak points is produced hereby.

Figure 4:
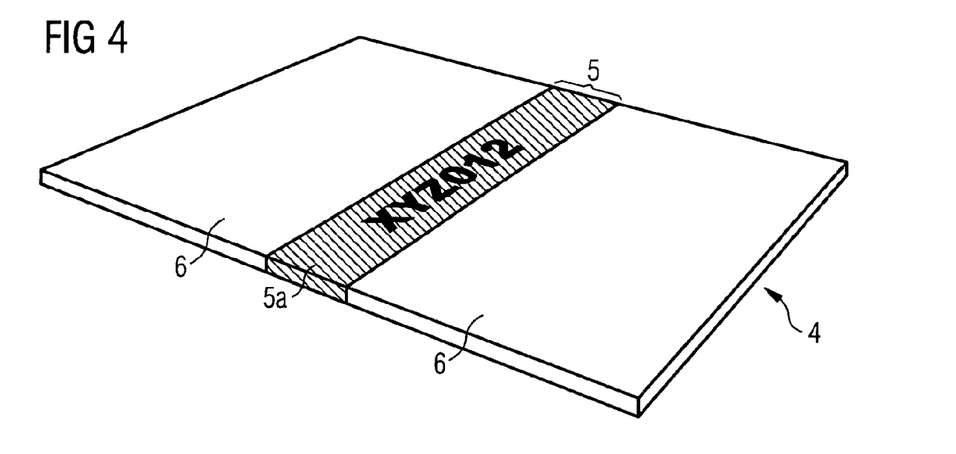
FIG. 4 a perspective view of a second embodiment.

In FIG. 4 there is represented a coextruded foil 4 in the form of a strip foil according to a second embodiment. For clarity's sake, the representation of cover layers 3 is omitted. The printed layers 7, 8 are not provided in the second embodiment. The thread strip 5a of the strip foil 4 has a transparent base material, into which laser-sensitive pigments, for instance IR-absorbing pigments such as carbon black particles, are incorporated. This permits a local change of the visual impression of the thread strip 5a for creating the security thread 5, for example a local blackening with the aid of a laser radiation or laser inscription and thus a personalization of the data carrier card after the manufacturing thereof, as indicated in FIG. 4 by the writing "XYZ012". Here, the thread strip 5a can be changed per laser radiation from two sides, i.e. from the front as well as from the back side of the strip foil 4. In a variant of the second embodiment, by further pigments or substances within the thread strip 5a or in a printed layer 7 applied thereon there can be created further effects for the security thread 5.

In a further, not represented embodiment variant, in the thread strip 5a and/or a printed layer 7 arranged thereon there are provided color-shift pigments, such as for example Colorcrypt, Colorstream, Iriodin, OVI or STEP pigment, which produce a color-shift effect upon tilting, for example around the longitudinal direction of the security thread 5a.

Figure 5:
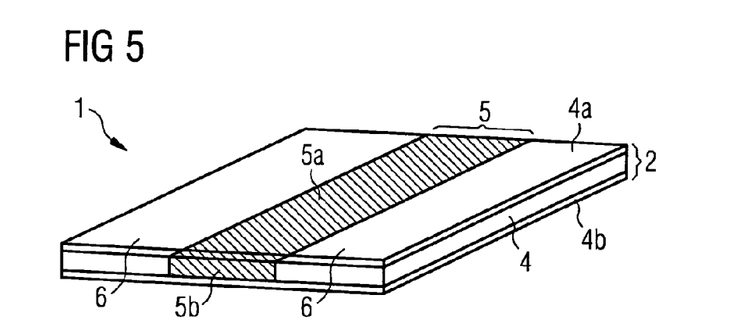
FIG. 5 a perspective view of a third embodiment.

In FIG. 5 there is represented the card core 2 of a data carrier card 1 according to a third embodiment. The card core 2 comprises an interior foil 4, which is configured in the form of a coextruded strip foil. The data carrier card 1 further comprises a first, further foil 4a arranged over the full area on the front side of the strip foil 4 and a second, identical, further foil 4b arranged on the back side. The further foils 4a and 4b are UV-absorbing, but transmissive, in particular transparent to visible light. The thread strip 5a of the strip foil 4 comprises fluorescent pigments which are excitable by UV radiation. The further strips 6 of the strip foil 4 have a condition different from the thread strip 5a. For example, the security thread 5a is transmissive, while the neighboring strips 6 are opaque. Printed layers 7, 8 like in the first embodiment are not provided in the fourth embodiment. Accordingly, the thread strip 5a containing the fluorescent pigments is completely covered, apart from the face surfaces, by the UV-absorbing further foils 4a, 4b. Upon UV excitation, fluorescence thus only occurs at the face surfaces 5b of the thread strip 5a, which represents an interesting optical effect.

In a not represented variant of the third embodiment, the UV-absorbing foils act as cover layers 3. In a further, likewise not represented variant of the third embodiment, the fluorescent pigments or substances are additionally or alternatively arranged in a printed layer 7 applied to the thread strip 5a.

Figure 6:
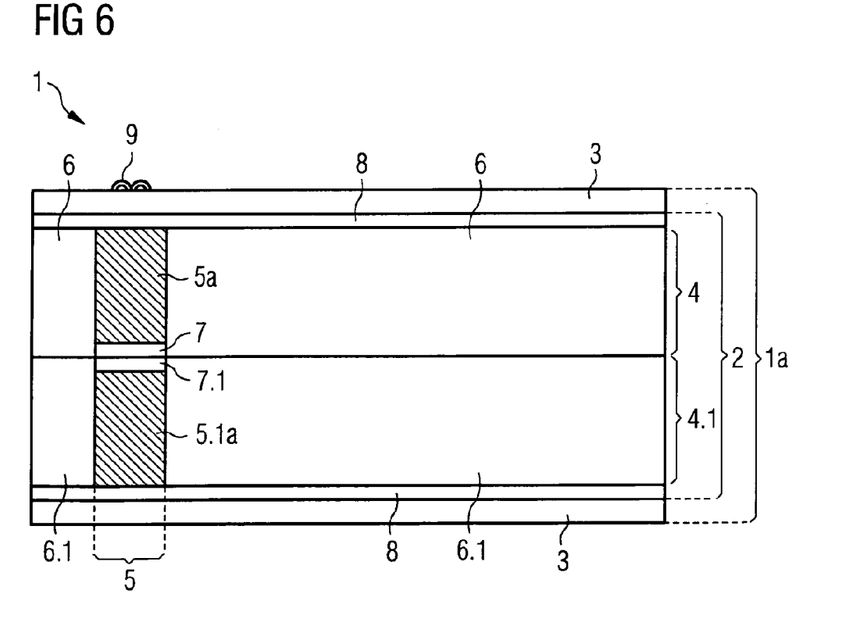
FIG. 6 a cross section through a fourth embodiment.

In FIG. 6 there is represented a cross section through a fourth embodiment of a data carrier card 1. Therein, the card core 2 comprises two coextruded foils 4, 4.1 respectively configured as a strip foil and mutually laminated, which in this embodiment are inner foils. The upper strip foil 4 represented in FIG. 6, comprises a thread strip 5a and further neighboring strips 6, while the bottom strip foil 4.1 represented in FIG. 6 likewise comprises a thread strip 5.1a as well as further strips 6.1. The further strips 6, 6.1 here are configured to be opaque, while the thread strips 5a are transmissive and show, where applicable, further optical effects. The two thread strips can be configured in like or different manner, by they differing e.g. in a material property or carrying different security or authenticity features. As represented in FIG. 6, the two foils 4, 4.1 are arranged preferably in such a way that the respective thread strips 5a, 5.1a lie congruent one over the other; each thread strip 5a, 5.1a thus forming a part of the security strip 5. An arrangement different from the congruent arrangement of the thread strips 5a, 5.1a is, of course, possible.

In the embodiment according to FIG. 6, on the upper strip foil 4 there is provided, congruent to the thread strip 5a, a printed layer 7 as an underprint made of a mirror ink. On the bottom strip foil 4.1 there is represented, congruent to the thread strip 5a, a printed layer 7.1 as an overprint likewise made of a mirror ink. The two printed layers 7, 7.1 can be configured identically. With the aid of the printed layers 7, 7.1 there can also be produced interference effects in the resulting security thread 5. Alternatively or additionally to these interference effects, with the aid of the printed layers 7, 7.1 made of mirror ink, there can also be produced an identical visual impression of the security thread 5 upon viewing the front and back side. The printed layers 7, 7.1 again are basically optional and may be omitted singly or both.

In the embodiment according to FIG. 6, on the cover layer 3 of the data carrier card 1 there are further provided microlenses 9 above the security thread 5, with the aid of which an MLI, CLI or DLI can be realized. In a not represented variant of this embodiment, these microlenses 9 are arranged at the edge of the data carrier card 1 in bled-off manner.

Optionally, a further printed layer 8 is respectively arranged on the surfaces of the card core 2 by means of offset printing or screen printing, which may also extend over the front side and back side of the security thread 5.

In addition to the security features of a mirror ink and an MLI, CLI or DLI mentioned in the fourth embodiment, there can also be provided the further, already mentioned substances and pigments, which can represent security features or are optically active, in the thread strips 5a, 5.1a or in the printed layers 7, 7.1, 8 lying above them and be combined with each other.

Altogether, for the embodiment of the FIG. 6 there arises a plurality of degrees of freedom in the realization of the resulting security thread 5, which arises from the cooperation of the thread strips 5a, 5.1a and possibly present printed layers 7, 7.1, 8.

In a not represented further embodiment, instead of the strip foil 4.1 on the bottom in the fourth embodiment, a foil configured to be homogeneous over the full area is provided. This increases the stability of the card core 2 and thus of the data carrier card 1.

The invention claimed is:

1. A data carrier card comprising:
   a card body including one or several foils and a security thread integrated in the card body,
   wherein at least one of the foils is manufactured by coextrusion and includes at least a thread strip and a bordering strip lying side by side in the area dimension of said at least one of the foils,
   wherein the thread strip differs in at least one material property from the bordering strip, and to the thread strip there is applied, as an overprint or underprint, at least one printed layer, and
   wherein the thread strip forms, by cooperation with the at least one printed layer, the security thread or a part of the security thread.

2. The data carrier card according to claim 1, wherein a visually perceptible effect arises by the cooperation of the thread strip and the at least one printed layer.

3. The data carrier card according to claim 1, wherein a metallically lustrous effect and/ or an interference effect arises by the cooperation of the thread strip and the at least one printed layer.

4. The data carrier card according to claim 1, wherein the thread strip is configured to be transmissive.

5. The data carrier card according to claim 4, wherein the card body or at least a card core of the card body has two or more than two coextruded strip foils arranged one over the other, which respectively have a thread strip, wherein the respective thread strips lie one over the other.

6. The data carrier card according to claim 1, wherein at least one foil forms an inner foil of the card body and at least one printed layer is configured on this inner foil.

7. The data carrier card according to claim 1, wherein the thread strip and/ or a printing ink of a printed layer contains color-shift pigments, silver-colored, goldcolored and/ or lustrous pigments or substances, fluorescent or thermochromic pigments or substances, laser-sensitive pigments or substances, such as carbon black, and/ or other kinds of elements such as Charms, taggants and/ or mottling fibers.

8. The data carrier card according to claim 1, wherein the printed layer applied to the thread strip is an ink, rainbow or mirror layer, which is applied as a screen or offset printed layer.

9. The data carrier card according to claim 1, wherein the printed layer is configured on the thread strip to be congruent.

10. The data carrier card according to claim 1, wherein the thread strip contains fluorescent pigments or substances and on both sides on the at least one foil there is respectively arranged a UV-absorbing foil.

11. The data carrier card according to claim 1, wherein the security thread makes available to a viewer mutually different items of incident light and transmitted light information.

12. The data carrier card according to claim 1, wherein cylindrical lenses are arranged on the data carrier card above the security thread and/or at a margin of the card body.

13. The data carrier card according to claim 1, wherein the thread strip has a laser inscription produced by laser radiation.

14. The data carrier card according to claim 1, wherein on the at least one foil there is arranged at least one further foil, wherein the foils are mutually laminated or coextruded and the further foil is a cover layer or part of a card core of the card body and is configured to be uniform over the full area and is transparent or translucent.

15. The data carrier card according to claim 1, wherein the data carrier card has at least one cover layer which contains laser-sensitive pigments or substances.

16. The data carrier card according to claim 1, wherein the printed layer extends, beside the thread strip, to further regions of the foil coextruded with the thread strip.

17. The data carrier card according to claim 1, wherein the thread strip has a width between 0.5 and 10 mm, and/ or with a width between 1 and 20% of the width of the strip foil.

18. The data carrier card according to claim 1, wherein the at least one foil is a coextruded strip foil, in which the thread strip is surrounded by two bordering strips, which each have an identical condition that is different from the thread strip.

19. A method for manufacturing a data carrier card having a card body comprising one or several foils and a security thread integrated in the card body, according to claim 1, comprising the steps of:
   coextruding a thread strip with at least one of the foils,
   applying a printed layer to the thread strip, which produces a tamper-resistant security feature by cooperation with the thread strip and together with the thread strip forms the security thread or a part of the security thread.

20. The method according to claim 19, wherein the thread strip and/ or another foil of the card body, contains laser-sensitive pigments or substances and the data carrier card is personalized by laser radiation.

* * * * *